Figure 1:
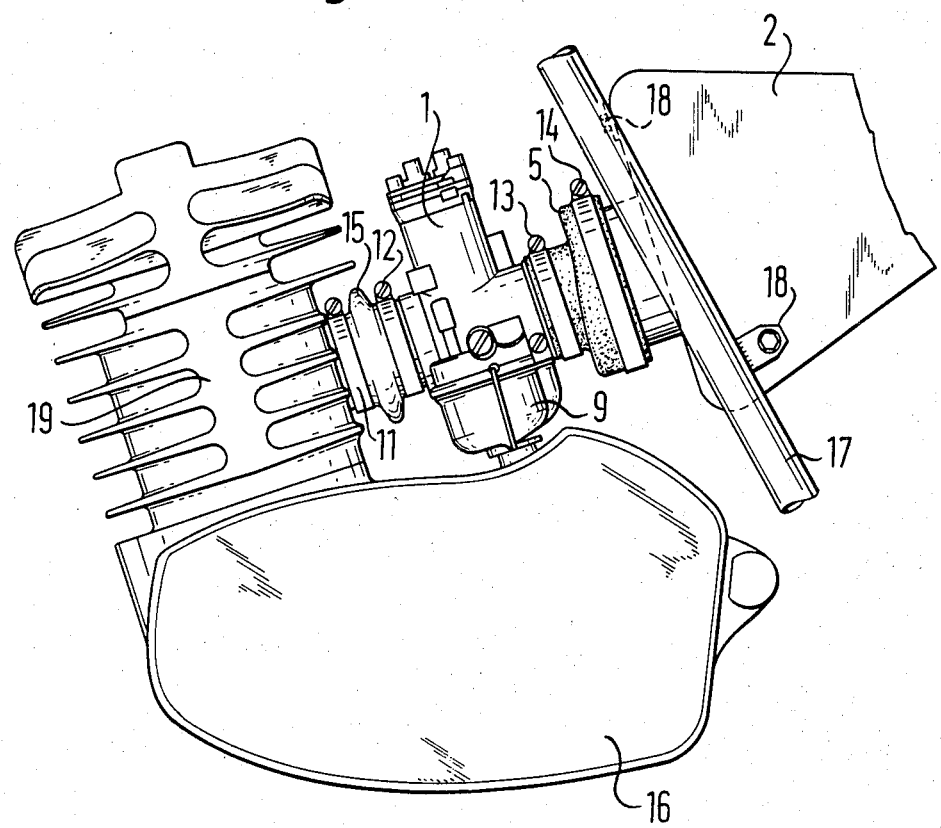

United States Patent [19]

Appelbaum

[11] 4,224,919
[45] Sep. 30, 1980

[54] INTERNAL-COMBUSTION ENGINE ARRANGEMENT WITH IMPROVED CARBURETOR MOUNTING

[75] Inventor: Hermann Appelbaum, Bergrheinfeld, Fed. Rep. of Germany

[73] Assignee: Fochtel & Sachs AG, Schweinfurt, Fed. Rep. of Germany

[21] Appl. No.: 957,140

[22] Filed: Nov. 2, 1978

[30] Foreign Application Priority Data

Nov. 17, 1977 [DE] Fed. Rep. of Germany ....... 2751348

[51] Int. Cl.[3] .......................... F02F 7/00; F16F 15/02
[52] U.S. Cl. ........................... 123/195 A; 123/198 E; 181/204; 180/219
[58] Field of Search ........... 123/195 R, 195 A, 198 E; 181/204, 229; 180/219, 291, 228

[56] References Cited

U.S. PATENT DOCUMENTS

| 3,698,503 | 10/1972 | Koyama | 180/219 |
| 3,757,882 | 9/1973 | Honda | 180/219 |
| 3,810,526 | 5/1974 | Kawasaki | 123/198 E |
| 3,875,918 | 4/1975 | Loynd | 123/141 |

FOREIGN PATENT DOCUMENTS 1135241  8/1962  Fed. Rep. of Germany ....... 123/198 E Primary Examiner—Charles J. Myhre
Assistant Examiner—Craig R. Feinberg
Attorney, Agent, or Firm—Toren, McGready and Stanger

[57] ABSTRACT

The carburetor of a motorcycle engine is fastened to an engine cylinder by a thin resilient hose connecting the fuel mixture outlet port of the carburetor to the intake port of the cylinder. The carburetor is fastened to the casing of the associated air cleaner much more rigidly than it is fastened to the cylinder. The fastening connection between the carburetor and the air cleaner casing is provided by a tubular member having a wider orifice fastened to said casing, a narrower orifice fastened to the carburetor, and a shoulder portion connecting the orifices and of greater wall thickness near the float chamber in the carburetor than elsewhere.

7 Claims, 2 Drawing Figures

INTERNAL-COMBUSTION ENGINE ARRANGEMENT WITH IMPROVED CARBURETOR MOUNTING

This invention relates to internal-combustion engines, and particularly to the mounting of a carburetor between an engine cylinder and an air cleaner casing which provide the only significant, stress-transmitting connection between the carburetor and the structure supporting the cylinder and air cleaner casing, such as the frame of a motorcycle.

The afore-described mounting of the carburetor is convenient in motorcycles because of the small space required. However, the liquid fuel in the float chamber of the carburetor tends to the shaken into a froth if vibration at high frequency is transmitted from the cylinder to the carburetor. It has been attempted to avoid vibration of the carburetor by resilient mountings and damping arrangements, but they are not always effective in preventing oscillation of the carburetor and its contents at the natural frequency of the carburetor assembly.

It is the primary object of the invention to provide an engine arrangement in which a carburetor is mounted practically exclusively on an engine cylinder and an air cleaner casing, but is unable to oscillate at an amplitude sufficient to cause frothing or foaming of the liquid fuel in the float chamber.

With this object and others in view, as will hereinafter become apparent, the invention provides an internal-combustion engine arrangement in which the carburetor is fastened to a cylinder of the engine by a thin, resilient hose connecting the fuel-mixture outlet port of the carburetor to the intake port of the engine. Other fastening elements fasten the carburetor much more rigidly to the casing of an associated air cleaner than the carburetor is fastened to the cylinder by the hose.

Figure 2:
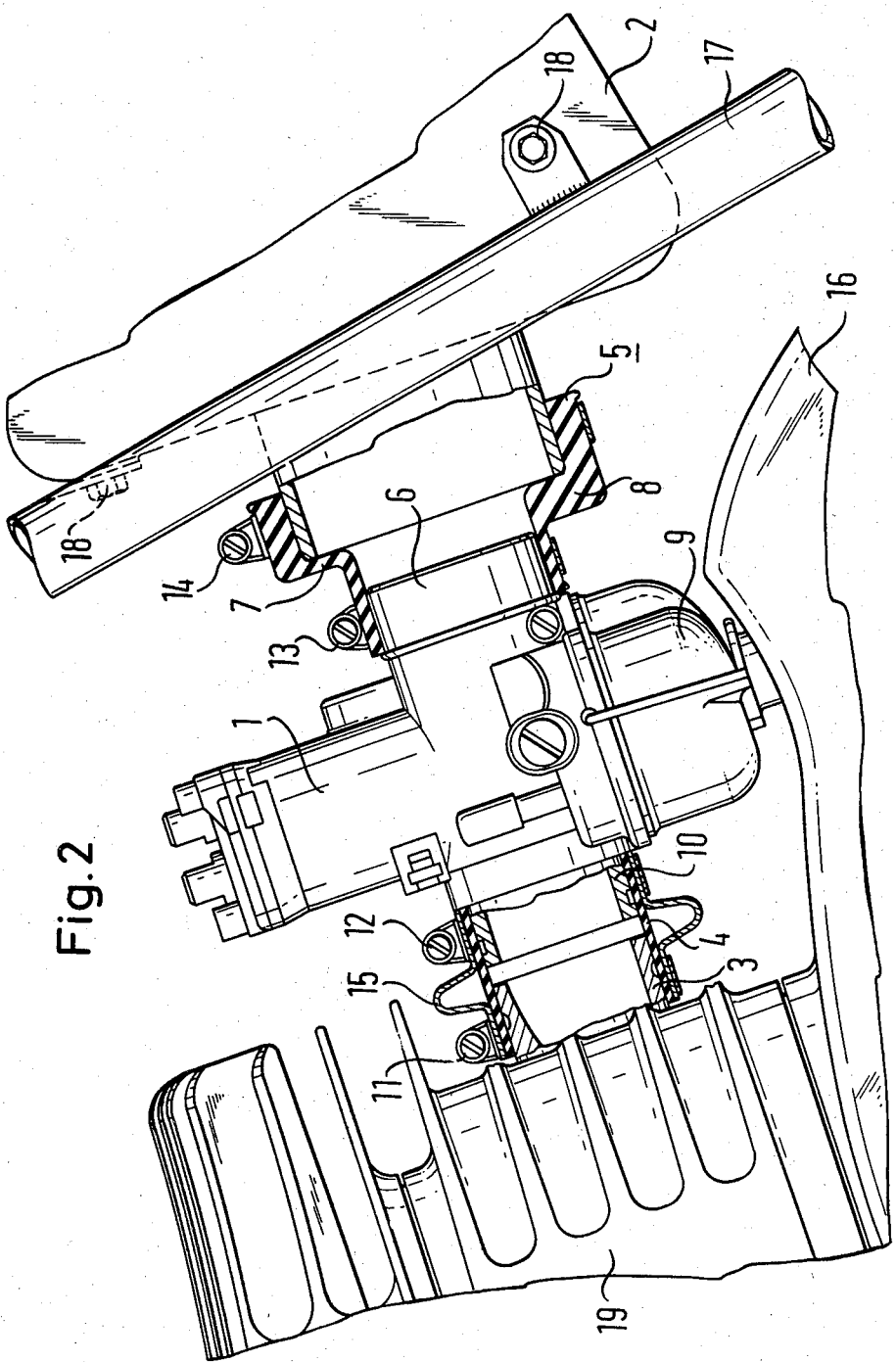

Other features, additional objects and many of the attendant advantages of this invention will readily be appreciated as the same becomes better understood by reference to the following detailed description of a preferred embodiment when considered in connection with the appended drawing in which:

FIG. 1 shows only as much of an otherwise conventional motorcycle in side elevation as is needed for an understanding of the invention; and FIG. 2 illustrates the device of FIG. 1 in fragmentary side-elevational section on a larger scale.

Referring initially to FIG. 1, there is shown only one tube 17 of an otherwise conventional motorcycle frame on which an air cleaner casing 2 is fixedly mounted by means of straps and lugs 18. The casing 2 which encloses an air filter, conventional and not itself shown, is connected to a carburetor 1 by a molded, tubular connector 5 of oil resistant synthetic rubber, the connector 5 being attached to the casing 2 and the carburetor 1 by pipe clamps 14, 13. Similar clamps 11, 12 attach sheet-metal bellows 15 to the fuel-mixture outlet port of the carburetor 1 and the intake port of the single cylinder 19 of the illustrated engine. A transmission casing 16 obscures portions of the cylinder 19 not directly relevant to this invention and the fuel supply line and control elements conventionally connected to the carburetor 1.

As is better seen in FIG. 2, the molded rubber connector 5 has a wider orifice portion clamped to a tubular outlet of the casing 2 by the pipe clamp 14 and communicating with the interior of the casing, and a narrower orifice portion of reduced flow section which receives therein the tubular inlet port 6 of the carburetor 1 to which it is sealed by the pipe clamp 13. The annular shoulder portion of the connector 5 which separates the casing outlet from the carburetor port 6 in the direction of air flow has a circumferential part 8 adjacent the float chamber 9 in the carburetor 1 whose wall thickness is many times greater than the wall thickness in the diametrically opposite circumferential part 7, and the non-illustrated parts of the shoulder portion gradually increase in wall thickness from the part 7 to the part 8.

The fuel-mixture outlet port 10 of the carburetor 1 is conformingly received in a thin, resilient hose 4 of oil-resistant synthetic rubber which also coaxially receives the tubular portion 3 of the fuel-mixture inlet port of the cylinder 19. The external diameters of the ports 10, 3 are equal and not significantly greater than the inner diameter of the hose 4 when in the relaxed condition. Because of these dimensional relationships, the hose 4 does not tend to enter the gap axially separating the ports 3, 10. The afore-mentioned bellows 15 are radially interposed between the pipe clamps 11, 12 and the hose 4, and thereby protect the thin hose 4 against injury when the clamps are tightened. The bellows also protect the hose against mechanical damage by external forces and against detrimental environmental effects, such as those of ozone and ultraviolet light.

The connector 5 and the hose 4 together with the bellows 15 provide the sole, significant, stress-transmitting connection between the carburetor and the supporting motorcycle frame represented in the drawing only by the tube 17. The carburetor 1 is fastened to the casing 2, and thereby to the vehicle frame, much more rigidly than it is fastened to the cylinder 19 by the hose 4 and the equally thin and resilient bellows 15. The casing 2, fixedly mounted on the vehicle frame, thus secures the carburetor 1 against vibration transmitted by the cylinder 19, particularly at high engine speed. The heavy wall 8 of the connector 5 particularly protects the float member 9 against oscillations which may otherwise cause the fuel in the chamber to froth and foam. The thin metal tube supplying liquid fuel to the carburetor 1, not itself shown, and the non-illustrated Bowden cables which connect the movable elements of the carburetor 1 to manual and automatic controls do not materially contribute to the fastening of the carburetor 1 to the vehicle frame. They can neither induce oscillation of the carburetor, nor could they contribute significant resistance to such oscillation if caused by the events in the cylinder 19.

It should be understood, of course, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. An internal-combustion arrangement comprising:
   (a) a support;
   (b) a cylinder mounted on said support and having an extended intake port for fuel mixture;
   (c) an air cleaner casing mounted on said support;
   (d) a carburetor having an air-inlet port and an extended fuel-mixture outlet port, said carburetor including a float chamber, said fuel-mixture outlet port being closely spaced from and in general alignment with said intake port so that a narrow annular gap having a length less than either of said outlet port or intake port exists between said outlet port and intake port;

(e) first fastening means fastening said carburetor to said cylinder and including a thin, resilient hose connecting said outlet port to said intake port, said hose bridging the narrow annular gap between said outlet port and intake port and the dimensional relationship of said hose, outlet port, intake port and annular gap being such that said hose does not enter into the annular gap during engine operation; and (f) second fastening means fastening said carburetor to said air cleaner casing more rigidly than said carburetor is fastened to said cylinder by said first fastening means whereby said carburetor is mounted on said cylinder and air cleaner casing so that it does not oscillate at an amplitude sufficient to cause frothing of liquid fuel in said flow chamber.

2. An arrangement as set forth in claim 1, wherein said first and second fastening means constitute the sole significant, stress-transmitting connections between said carburetor and said support.

3. An arrangement as set forth in claim 2, wherein said support is the frame of a motorcycle.

4. An arrangement as set forth in claim 1, wherein the internal cross section of said hose in the relaxed condition is not significantly smaller than the external cross sections of respective tubular parts of said outlet port and of said intake port, said tubular parts being received in said hose.

5. An arrangement as set forth in claim 4, further comprising two hose clamps fastening respective portions of said hose to said tubular parts.

6. An arrangement as set forth in claim 5, wherein said first fastening means further include a bellows-shaped, tubular member enveloping said hose, respective parts of said bellows-shaped member being interposed between said hose and said hose clamps for protecting said hose.

7. An arrangement as set forth in claim 1, 2 or 4, wherein said second fastening means include a tubular member of resilient material formed with a bore therethrough for the flow of air from said casing to said carburetor, said tubular member having a first orifice portion connected to said air-inlet port, a second orifice portion attached to said air cleaner casing, the portion of said bore is said second orifice portion having a greater flow section than the portion of said bore in said first orifice portion and communicating with the interior of said air cleaner casing, and an annular shoulder portion connecting said orifice portions, respective circumferential parts of said shoulder portion being adjacent to and remote from said float chamber, the wall thickness of said shoulder portion in said adjacent part being greater than the wall thickness thereof in said remote part.

* * * * *

UNITED STATES PATENT OFFICE
CERTIFICATE OF CORRECTION

Patent No. 4,224,919   Dated Sept. 30, 1980

Inventor(s)  Hermann Appelbaum

It is certified that error appears in the above-identified patent and that said Letters Patent are hereby corrected as shown below:

In the heading of the Patent [73] should read as follows:

[73] Assignee: Fichtel & Sachs AG, Schweinfurt, Fed. Rep. of Germany

Signed and Sealed this

Tenth Day of February 1981

[SEAL]

Attest:

RENE D. TEGTMEYER

*Attesting Officer*   *Acting Commissioner of Patents and Trademarks*